(12) United States Patent
Ya

(10) Patent No.: US 11,762,961 B2
(45) Date of Patent: Sep. 19, 2023

(54) MANAGEMENT OF SOFTWARE LICENSES FOR DEPLOYED IMAGES

(71) Applicant: GraphSQL Inc., Redwood City, CA (US)

(72) Inventor: Heqing Ya, Redwood City, CA (US)

(73) Assignee: TigerGraph, Inc., Redwood City, CA (US)

( * ) Notice: Subject to any disclaimer, the term of this patent is extended or adjusted under 35 U.S.C. 154(b) by 618 days.

(21) Appl. No.: 16/812,556

(22) Filed: Mar. 9, 2020

(65) Prior Publication Data

US 2021/0279302 A1 Sep. 9, 2021

(51) Int. Cl.
*G06F 21/10* (2013.01)
*G06F 21/44* (2013.01)
*G06F 9/455* (2018.01)

(52) U.S. Cl.
CPC ........ *G06F 21/105* (2013.01); *G06F 9/45558* (2013.01); *G06F 21/44* (2013.01); *G06F 2009/45562* (2013.01)

(58) Field of Classification Search
CPC .... G06F 21/105; G06F 9/45558; G06F 21/44; G06F 2009/45562
See application file for complete search history.

(56) References Cited

U.S. PATENT DOCUMENTS

2009/0271472 A1* 10/2009 Scheifler ............... G06F 9/5072 709/202
2013/0054948 A1* 2/2013 Raj ....................... G06F 9/4416 713/2
2019/0354675 A1* 11/2019 Gan .................... G06F 11/0712

\* cited by examiner

*Primary Examiner* — Bruce S Ashley

(57) ABSTRACT

Systems, methods, and software described herein provide operations to manage software licenses in relation to a virtualized image. In one implementation, a system may, during a first initiation of a virtualized instance, execute a process to determine and store registration information associated with the virtualized instance. Once stored, the system may delete the process and use the stored registration information during subsequent initiations of the virtualized instance to determine whether to permit software on the virtualized instance to be executed.

15 Claims, 6 Drawing Sheets

MANAGEMENT OF SOFTWARE LICENSES FOR DEPLOYED IMAGES

BACKGROUND

Application stores are becoming more prevalent in both end user devices, such as smartphones, computers, tablets, or other similar devices, and also in the cloud, wherein users may select an application, download the application, and execute the application on the end user device. These application stores are now further being adopted in cloud computing environments, wherein cloud computing providers may generate virtualization images, virtual machines or containers, that can be deployed by a user to provide various processing operations. These images may be deployed in a cloud service provider server or a local server of the end user, and may provide various operations, such as front-end server operations, back-end server operations, data processing operations, or some other operation.

However, while virtualization images may provide a convenient method for users to select and deploy particular applications as virtualized instances, managing the licenses for the images can be difficult and cumbersome. In particular, because virtualization images may be duplicated using images and other backup software, a single download of the original image may be used to deploy any number of virtualized instances.

OVERVIEW

Provided herein are operations to manage software licenses for deployed virtualization images. In one implementation, a method includes identifying a request to initiate a virtualized instance and, in response to the request, initiating a process in the virtualized instance to determine registration information associated with the registration instance. The method further provides for storing the registration information in the virtualized instance and, once stored, deleting the process that determined the registration information.

After generating the registration information and during a subsequent initiation of the virtualized instance, the method further includes comparing current configuration information associated with the subsequent initiation with the registration information stored in the virtualized instance to determine whether the subsequent initiation is permitted. If permitted, the method initiates an application associated with the image.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
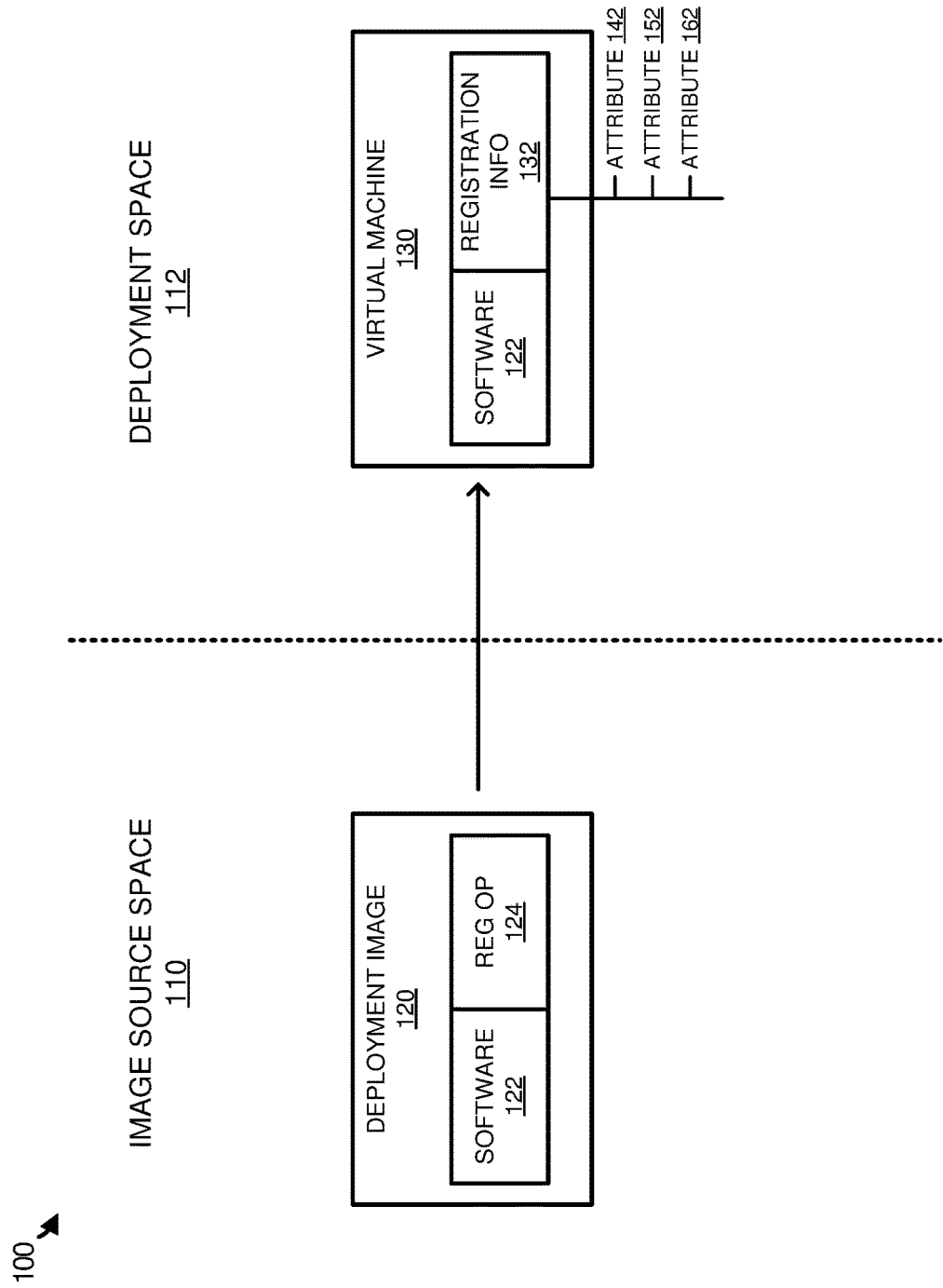
FIG. 1 illustrates a computing environment to deploy an image as a virtualized instance according to an implementation.

Examples herein provide enhancements for managing software licenses of virtualization images. In some implementations, one or more virtualization images may be placed in a repository or application store that permits users to request instances of the virtualization images. For example, an image for a virtual machine may include an operating system, software, and other resources capable of providing a data processing operation for a requesting user. When a user requests a new virtualized instance or new virtual machine from the image, resources may be allocated to support the request, such as processing resources, communication resources, memory resources, storage resources, and the like, and a new instance may be initiated using the resources. In some examples, the virtualized instance may be deployed in a cloud computing environment, wherein a cloud computing provider may manage the physical computing resources allocated to the user. In other examples, the virtualized instance may be deployed in a private computing environment, wherein the user may manage the physical computing resources for any virtualized instances associated with a user.

Here, in addition to the software the provides the requested operations for the end user, the image may further include a registration operation that can used to manage the software licensing associated with the image and the software. In some implementations, the registration operation may, when a virtualized instance is first initiated from the requested image, identify registration information associated with the virtualized instance. The registration information may include a media access control (MAC) address associated with the instance, a virtual machine identifier associated with the instance, a host associated with the instance, or some other attribute associated with the deployment of the instance. Once the registration information is determined, the registration operation may store the registration information in the virtualized instance.

After the registration information is stored in the instance, the registration operation may be removed or deleted from the instance, preventing future access to the registration operation. Advantageously, when the virtualized instance is subsequently initiated, such as following an update, a powered off period for the virtual machine, or power cycle of the physical host, the software may compare current configuration information for the instance with the stored registration information to determine whether the initiation of the instance is permitted. If the current configuration information and the stored registration information match, then the software that corresponds to the registration information may be executed. In contrast, if the current configuration information fails to match stored registration information, then the software that corresponds to the registration information may be blocked or prevented from execution. For example, if the image provided a data processing application for a database, the data processing application may only be executable when the registration information matches a current configuration for the executing virtual machine.

FIG. 1 illustrates a computing environment 100 to deploy an image as a virtualized instance according to an implementation. Computing environment 100 includes image source space 110 and deployment space 112. Image source space includes deployment image 120 with software 122 and registration operation 124. Deployment space 112 further includes virtual machine 130 with software 122 and registration information 132 with attributes 142, 152, and 162. Although demonstrated with three attributes in the present example, it should be understood that various attributes may be maintained as part of registration information 132.

In operation, a software provider may generate deployment image 120 that can be used to generate virtualized instances for various end users. For example, deployment image 120 may be provided to image source space 110, which may represent a repository application store where users can access and select desired images to provide desired functionality. The application store may be part of a cloud service provider, as part of an application store that permits downloads to local or privately-operated computing devices, or some other application repository. In some implementations, deployment image 120 may represent an image for a virtual machine or some other similar virtualized element. A virtual machine image is a template for creating new virtual machine instances, wherein each image may include an operating system and may further include other software, such as databases, application servers, applications, or some other process for the created image.

Here, deployment image 120 includes software 122 and registration operation 124. Software 122 is representative of software to provide various operations, which may include database operations, data processing operations, or some other operation. Registration operation 124 is used to manage the license when deploying deployment image 120 as a virtual machine. Although not pictured, deployment image 120 may further include an operating system and other processes that are required for the functionality of a virtual machine.

Once an image is generated and placed in image source space 110, a user with access to image source space 110 may request a new virtualized instance (a new virtual machine) that is derived from the deployment image. After the request, a new virtual machine 130 is deployed in deployment space 112, wherein virtual machine 130 may be allocated processing resources, memory resources, storage resources, or any other required resource for the virtual machine. Deployment space 112 may represent a cloud computing environment with one or more serving resources or may represent a private computing environment with one or more private servers capable of executing a virtual machine from the image. Once virtual machine 130 is initiated in deployment space 112, registration operation 124 is executed to generate registration information 132. Registration information 132 may include a MAC address, virtual machine identifier associated with virtual machine 130, a host identifier associated with the host for virtual machine 130, or some other information or attribute associated with virtual machine 130. Once registration information 132 is stored in virtual machine 130, registration operation 124 is deleted or removed from virtual machine 130. Registration information 132 is then used on each subsequent initiation of virtual machine 130 to determine whether software 122 is permitted for execution on the virtual machine. In particular, if a duplicate of virtual machine 130 is initiated to make a new virtual machine in addition to virtual machine 130, the configuration information associated with the new virtual machine may not match registration information 132. When a failed match is detected, software 122 may be prevented from being executed on the new virtual machine.

Figure 2:
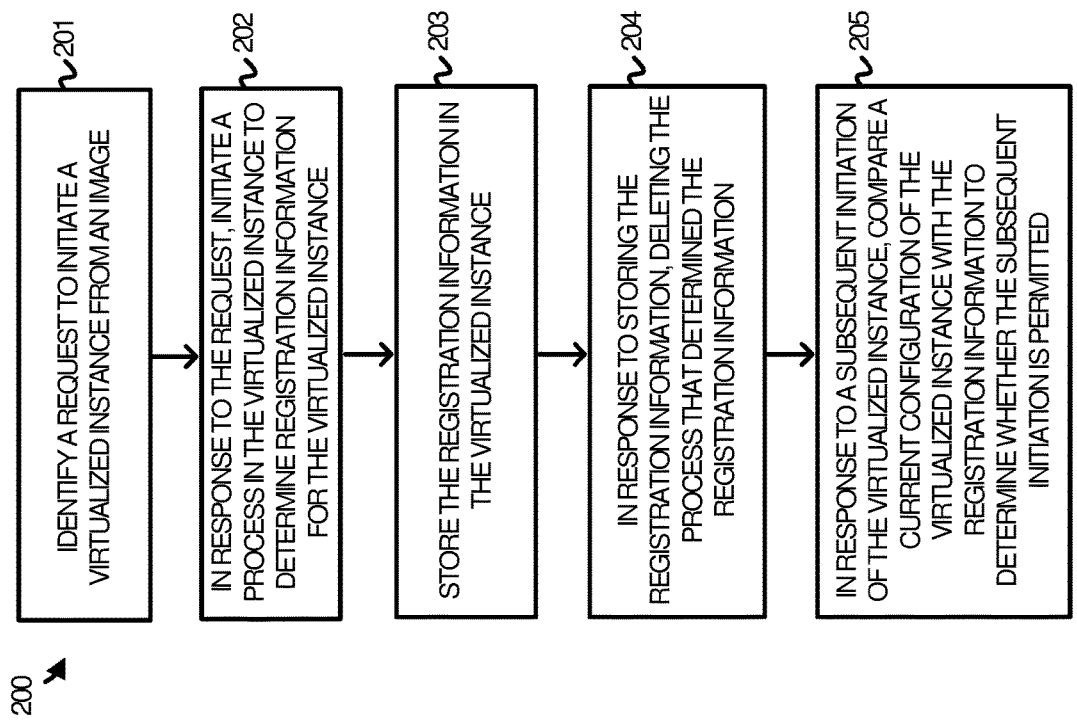
FIG. 2 illustrates an operation to deploy an image as a virtualized instance according to an implementation.

FIG. 2 illustrates an operation 200 to deploy an image as a virtualized instance according to an implementation. The processes of operation 200 are referenced parenthetically in the paragraphs that follow with references to the systems and elements of computing environment 100.

As depicted, operation 200 identifies (201) a request for a first initiation of a virtualized instance from an image. In some implementations, a service provider may include a repository of various images that can be used to deploy virtual machines, such as virtual machine 130. In response to the request and the first initiation of the virtualized instance, operation 200 initiates (202) a process in the virtualized instance to determine registration information associated with the virtualized instance and stores (203) the registration information in the virtualized instance. Referring to an example in computing environment 100, when a request is made for deployment image 120, virtual machine 130 is initiated to support the request. Once initiated, registration operation 124 is executed to generate registration information 132, which includes attributes 142, 152, and 162. In some examples, the attributes may be derived from the operating system of the virtual machine, the hypervisor, or some other support process for the virtual machine. In some examples, the registration information may be stored using an encryption key that encrypts the data prior to storage in virtual machine 130. This may permit the virtual machine to apply an encryption function during each subsequent initiation of the virtual machine to determine if current attributes match registration information 132.

After generating and storing the registration information, operation 200 deletes (204) the process that determined the registration information. Advantageously, by deleting the process, end users of the virtual machine will be unable to ascertain what registration information is used in generating the license for the software on the virtual machine. In some examples, when virtual machine 130 is initiated operation 200 may further prevent communications that use one or more protocols. These protocols may include SSH, or some other protocol that can permit a user to access the virtual machine prior to registering software 122. After storing the registration information and deleting the corresponding registration operation, operation 200 may the enable the one or more protocols to permit access to the virtual machine.

Once the registration information is stored in virtual machine 130, operation 200 further, in response to a second initiation of the virtualized instance, compares (205) current configuration information associated with the subsequent initiation with the registration information stored in the virtualized instance to determine whether the subsequent initiation is permitted. For example, if virtual machine 130 were shut down, migrated, or otherwise stopped, operation 200 may be used to identify current configuration information associated with the new initiation and compare that current configuration information with the stored registration information. The current configuration information may include a virtual machine identifier, a MAC address, an IP address, or some other information associated with the virtual machine. When the current configuration information matches the registration information, operation 200 may permit the execution of the corresponding software 122. However, when the current configuration information does not match the registration information, operation 200 may block the execution of the corresponding software 122. For example, if a user associated with virtual machine 130 took a snapshot of virtual machine 130 after the storage of registration information 132, the snapshot may be used to generate multiple duplicates of virtual machine 130. However, when the duplicate is deployed, operation 200 may determine current configuration information associated with the new initiation and determine that the current configuration information fails to match the stored registration information.

In some examples, similar to the operations described above with respect to generating and storing registration information 132, operation 200 may prevent ingress or egress communications associated with one or more protocols prior to the completion of the matching operation. Once the matching is complete and software 122 is determined to be permitted for execution, the one or more protocols may be enabled for interaction with virtual machine 130.

Figure 3:
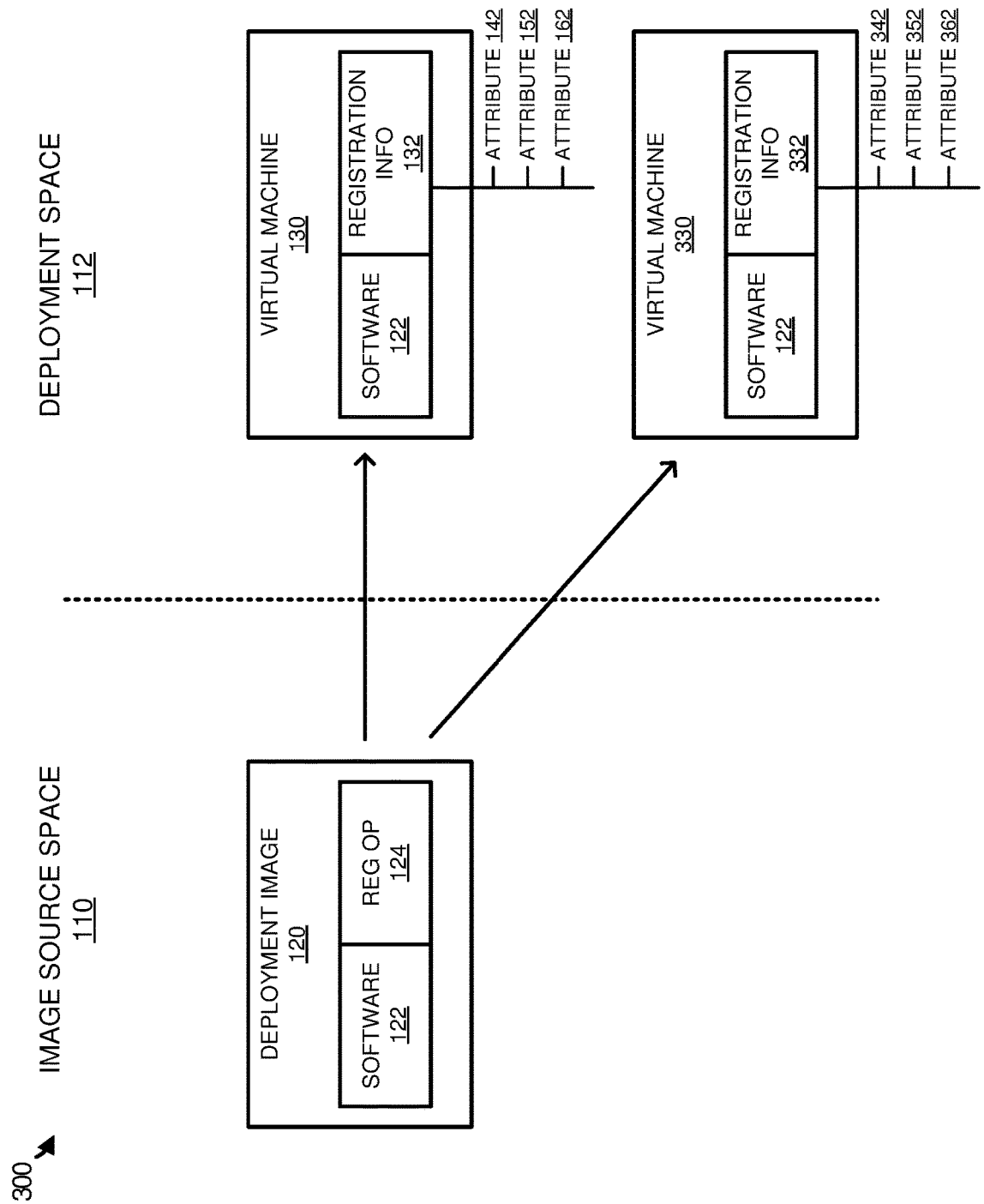
FIG. 3 illustrates an operational scenario to deploy an image as virtualized instances according to an implementation.

FIG. 3 illustrates an operational scenario 300 to deploy an image as virtualized instances according to an implementation. Operational scenario 300 includes systems and elements from computing environment 100 of FIG. 1. Operational scenario 300 further includes virtual machine 330 that includes software 122 with registration information 332, wherein registration information 332 includes attributes 342, 352, and 362.

As described herein, a software developer may generate deployment image 120 and store the image in image source space 110, which is representative of a repository for users to select and deploy required images. Once stored and a user selects the image, a new virtualized instance or virtual machine is initiated to support the request. Here, multiple requests are generated for deployment image 120 and are used to generate virtual machine 130 and virtual machine 330.

Referring first to virtual machine 130, registration operation 124 is executed upon initiation of the virtual machine to generate registration information 132, wherein registration information 132 corresponds to unique attributes of the virtual machine. Once executed registration operation 124 may be removed from virtual machine 130. Turning to a second request for deployment image 120, a second virtual machine 330 is initiated and registration operation 124 generates registration information 332 that corresponds to unique attributes of virtual machine 330. For example, registration information 132 and 332 may include at least a MAC address associated with the corresponding virtual machine and a virtual machine identifier associated with the corresponding virtual machine. Once the registration information is stored in the virtual machines and registration operation 124 is deleted from each of the virtual machines, software 122 may be permitted to execute on the virtual machine. Software 122 may comprise a data processing application, a front end serving application, a database management application or some other application. Although not illustrated in operational scenario 300, each virtual machine may further include an operating system and/or other support services or applications to provide the desired functionality associated with software 122

In some implementations, when a virtual machine is first initiated from deployment image 120, one or more communication protocols may be disabled for the virtual machine. Once the registration information is generated and stored, the one or more protocols may be enabled, permitting interactions with the virtual machine. These interactions may be used to configure software 122, permit software 122 to communicate with one or more other databases or applications or provide some other functionality.

Figure 4:
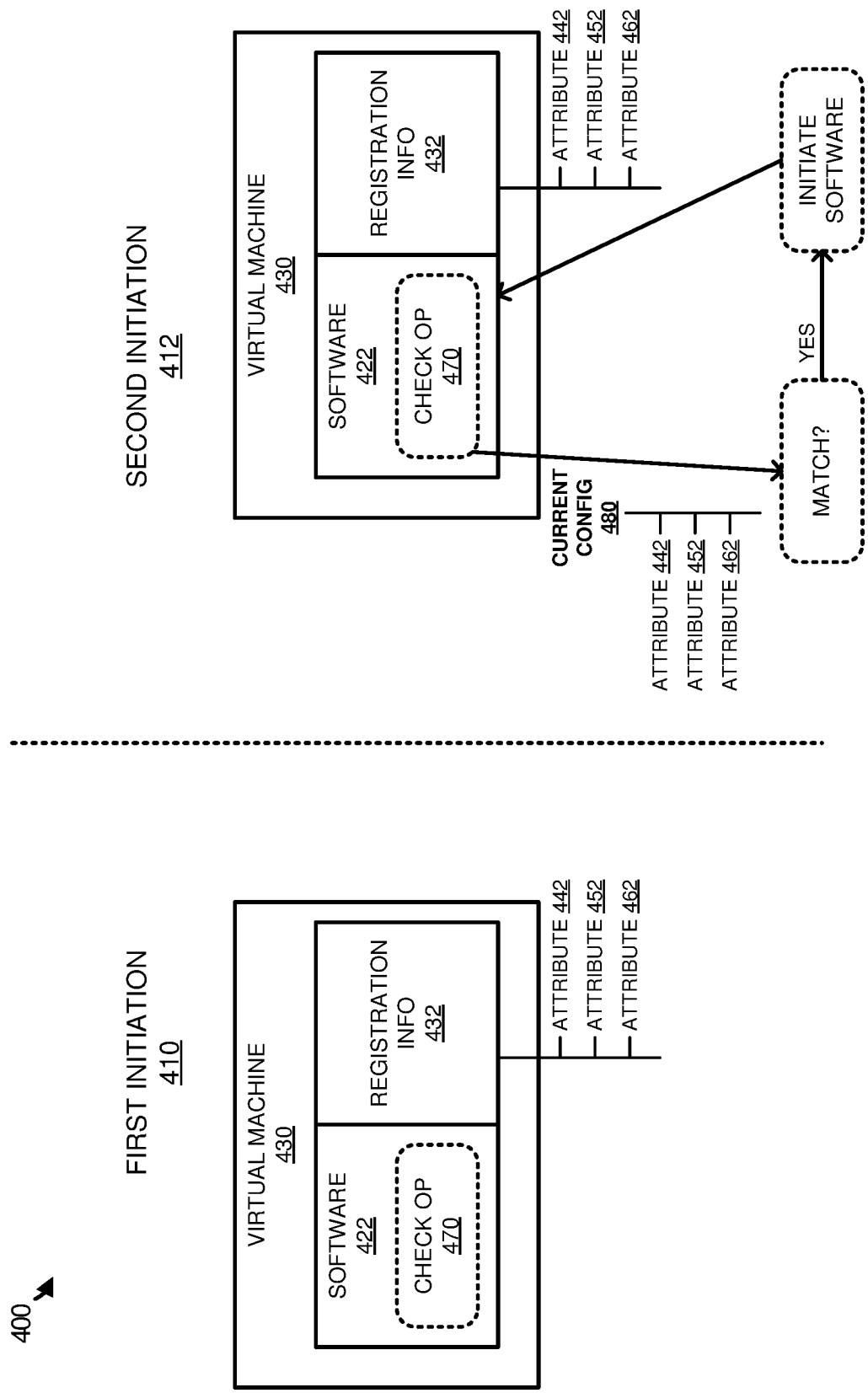
FIG. 4 illustrates an operational scenario of managing licenses in a virtualized instance according to an implementation.

FIG. 4 illustrates an operational scenario 400 of managing licenses in a virtualized instance according to an implementation. Operational scenario 400 includes first initiation 410 and second initiation 412. First initiation 410 includes virtual machine 430 with software 422, check operation 470, and registration information 432 with attributes 442, 452, and 462. Second initiation 412 includes virtual machine 430, software 422, check operation 470, and registration information 432.

In operation, when a virtual machine is first initiated from an image, a process on the virtual machine may generate registration information 432, wherein registration information 432 includes attributes to manage licensing for software 422. Software 422 may comprise a data processing application, a database application, or some other application. Once registration information 432 is generated for first initiation 410, the process that generated and stored registration information 432 is deleted or removed from virtual machine 430. Registration information 432 is then used to determine during subsequent initiations of virtual machine 430 whether software 422 is available for execution on the virtual machine.

Here, during second initiation 412, check operation 470 is used to compare a current configuration 480 for virtual machine 430 with registration information 432 to determine whether the current configuration matches the stored information. Here, the current configuration information matches registration information 432, which indicates that software 422 is permitted to execute on virtual machine 430. In some implementations, software 422 may be prevented from execution until check operation 470 is performed. Once the check operation is performed and the execution is permitted, software 422 may be made available for execution on the computing system. In some implementations, in preventing the execution of software 422, software 422 may be encrypted and decrypted for execution based on check operation 470, may be blocked using registry keys, or may be blocked in any other similar manner. In some examples, when check operation 470 determines that the current configuration information fails to match registration information 432, check operation 470 may remove or delete software 422 from virtual machine 430.

In some implementations, when second initiation 412 occurs, check operation 470 may disable one or more communication protocols to virtual machine 430. This may prevent an end user from interacting with virtual machine 430 until check operation 470 is completed. Once check operation 470 is completed and software 422 is permitted based on the comparison of the current configuration information and registration information 432, check operation 470 may reenable the one or more communication protocols. This will permit a user to interact with the available software and for the software to interact with any other required computing elements.

In some implementations, registration information 432 may be encrypted prior to storage in virtual machine 430. The encryption may be accomplished using public and private encryption keys that can encrypt the registration information using the public key (that is deleted as part of the first registration operation) and decrypted during the check of the registration information. The encryption may also be accomplished using a hash function or some other encryption function. For example, when registration information 432 is first identified, the information may be passed through a hash function and stored on virtual machine 430. During each subsequent initiation of the virtual machine, the current configuration information may be identified and passed through a hash function to determine if the hash values match.

Figure 5:
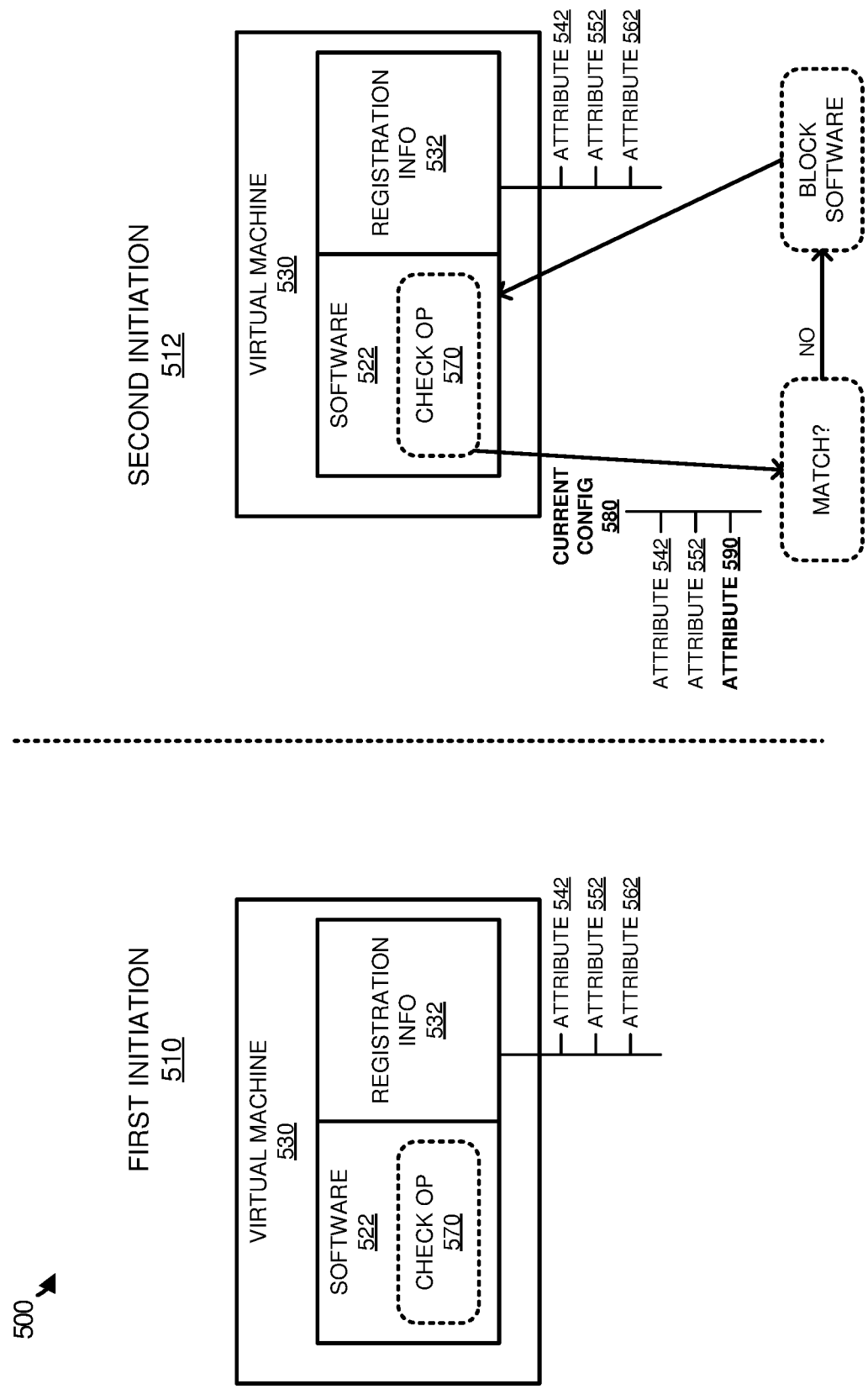
FIG. 5 illustrates an operational scenario of managing licenses in a virtualized instance according to an implementation.

FIG. 5 illustrates an operational scenario 500 of managing licenses in a virtualized instance according to an implementation. Operational scenario 500 includes first initiation 510 and second initiation 512. First initiation 510 includes virtual machine 530 with software 522, check operation 570, and registration information 532 with attributes 542, 552, and 562. Second initiation 512 includes virtual machine 530, software 522, check operation 570, and registration information 532.

In operation, when a virtual machine is first initiated from an image, a process on the virtual machine may generate registration information 532, wherein registration information 532 includes attributes to manage licensing for software 522. Software 522 may comprise a data processing application, a database application, or some other application. Once registration information 532 is generated for first initiation 510, the process that generated and stored registration information 532 is deleted or removed from virtual machine 530. Registration information 532 is then used to determine, during subsequent initiations of virtual machine 530, whether software 522 is available for execution on the virtual machine.

Here, in a second initiation 512 for virtual machine 530, check operation 570 is used to determine whether a match exists between a current configuration 580 for the virtual machine and registration information 532. In particular, check operation 570 may gather current configuration attributes associated with the second initiation and compare the attributes to attributes 542, 552, and 562 stored with respect to registration information 532. When check operation 570 determines that attribute 590 is different than attribute 562, check operation 570 may block the execution of software 522 from providing the desired operation. To block the execution, check operation 570 ensure that the executable portions of software 522 are encrypted, may modify registry keys or other attributes associated with the application, may delete at least a portion of software 522 from virtual machine 530, or may provide some other operation to prevent the execution of the software. For example, if the second initiation of virtual machine 530 occurred as a result of an image generated from virtual machine 530 during first initiation, the virtual machine during the second initiation may be allocated a different virtual machine identifier, MAC address, or some other attribute(s). Consequently, check operation 570 may determine the differences in the attributes and prevent the execution of the software (or the entire virtual machine in some examples).

In some implementations, the registration operation and the check operation may both be used to limit user interactions with the virtual machine during the licensing operations. In some implementations, each time that virtual machine 530 is initiated one or more communication protocols may be disabled to prevent user connections to the virtual machine. Once disabled, the licensing operations may be used to generate the registration information or compare the registration information to the current configuration for the virtual machine. Once the registration information is determined or the check operation indicates that the software should be available for execution, the one or more protocols may be enabled, permitting a user to interact with the virtual machine.

Figure 6:
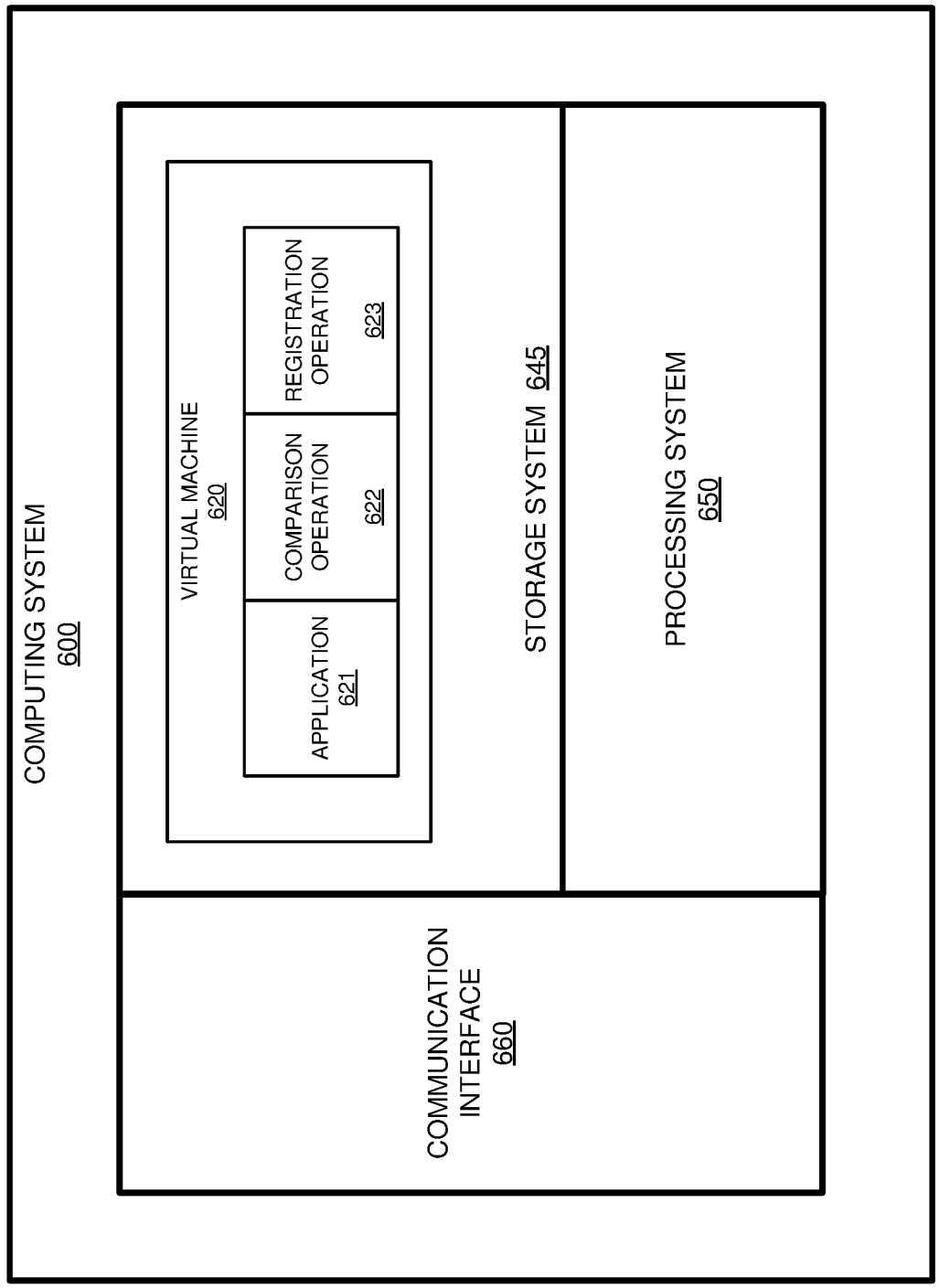
FIG. 6 illustrates a computing system to manage licenses for a virtualized instance according to an implementation.

FIG. 6 illustrates a computing system 600 to manage licenses for a virtualized instance according to an implementation. Computing system 600 is representative of any computing system or systems with which the various operational architectures, processes, scenarios, and sequences disclosed herein for a host system can be implemented. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more end user devices in some examples that permit a user to interact with virtual machine 620. Additionally, communication interface 660 may be used to communicate with one or more other computing systems that can provide resources to virtual machine 620, wherein the resources may include other applications, databases, or some other resource.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises virtual machine 620, wherein virtual machine 620 further includes application 621, comparison operation 622, and registration operation 623. The operating software on storage system 645 may further include an operating system, utilities, drivers, network interfaces, applications, or some other type of software. When read and executed by processing system 650, the operating software on storage system 645 directs computing system 600 to operate as described herein.

In one implementation, virtual machine 620 may be initiated in response to a request for an end user for an application image. The image may include the operating system for the virtual machine, services, applications, or any other required element to provide a desired operation. Once selected, a host for the virtual machine can be identified in either a public or provide computing environment, and the virtual machine may be provided with resources to execute the virtual machine.

Here, when virtual machine 620 is initiated, registration operation 623 is executed to determine licensing information associated with application 621. In some implementations, registration operation 623 directs processing system 650 to identify attributes associated with virtual machine 620. These attributes may include a MAC address associated with virtual machine 620, a virtual machine identifier, a host identifier, or any other attribute capable of identifying the virtual machine. Once identified, registration operation 623 directs processing system 650 to store the registration information in virtual machine 620, wherein the registration information may be stored as encrypted data in some examples. After storing the registration information, registration operation 623 is removed or deleted from virtual machine 620 to prevent access to the operation during future initiations of the virtual machine.

Once the registration information is stored, the registration information may be used by comparison operation 622 in future initiations of virtual machine 620 to determine whether application 620 should be made available to the user of virtual machine 620. The second initiation may come as a result to a stoppage of virtual machine, a power down of the host, a migration of the virtual machine between hosts, or some other second initiation. In response to the second initiation, comparison operation 622 may direct processing system 650 to determine current configuration associated with the virtual machine 620 and determine whether the current configuration matches the stored registration data from the first initiation. If a match exists, comparison operation 622 may direct processing system 650 to permit the execution of application 620. However, if a match does not exist, comparison operation 622 may direct processing system 650 to block the execution of application 620. In blocking the execution, comparison operation 622 may be used to prevent user access to the virtual machine, delete or encrypt the application, or provide some other operation to block the execution of application 620.

As an example, a user associated with virtual machine 620 may generate an image of the virtual machine after it is deployed in a host. From the image, the user may attempt to generate multiple instances to avoid paying for multiple licenses. Here, when a duplicate is deployed, comparison operation 622 may identify differences between the current configuration and the stored registration information and may block the execution of the application. These differences may include a different MAC addresses, different virtual machine identifiers, or some other different attribute.

In at least one example, operations 622-623 may be used to disable one or more communication protocols with virtual machine 620. In disabling the communication protocols, the operations may identify when the virtual machine is initiated and prevent incoming and outgoing communications to prevent a user from interacting with the virtual machine until the licensing operations are completed. In the example of registration operation 623, communications with the virtual machine may be prohibited until the registration information is stored on virtual machine 620. Similarly, once stored and during a subsequent initiation, communications may be prohibited until the current configuration information is compared to the previously stored registration information. Once the licensing operations are completed, the communication protocols may be enabled permitting a user to interact with the virtual machine or permitting the application to communicate with external resources. These resources may include other applications, databases, or some other resource.

Although demonstrated with a single application in the example of computing system 600, it should be understood that multiple applications may be available on a single image. The applications may share common registration information or may determine and store unique registration information.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying a request for a first initiation of a virtualized instance from an image;
   in response to the request and the first initiation, initiating a process in the virtualized instance to determine registration information associated with the virtualized instance;
   preventing ingress and/or egress communications for one or more communication formats prior to initiating the process to determine the registration information;
   storing the registration information in the virtualized instance;
   in response to storing the registration information, deleting the process that determined the registration information;
   in response to deleting the process that determined the registration information, enabling the ingress and/or egress communications for the one or more communication formats;
   in response to a subsequent initiation of the virtualized instance after the first initiation, comparing current configuration information associated with the subsequent initiation with the registration information stored in the virtualized instance to determine whether the subsequent initiation is permitted; and
   in response to determining that the subsequent initiation is permitted, making an application associated with the image available to a user of the virtualized instance.

2. The method of claim 1 further comprising, in response to determining that the subsequent initiation is not permitted, blocking an execution of the application associated with the image.

3. The method of claim 1, wherein comparing the current configuration information associated with the subsequent initiation with the registration information stored in the virtualized instance to determine whether the subsequent initiation is permitted comprises:
   determining whether a match exists between the current configuration information and the registration information;
   determining that the subsequent initiation is permitted when the match exists.

4. The method of claim 1, wherein the virtualized instance comprises a virtual machine.

5. The method of claim 1, wherein the registration information comprises a media access control (MAC) address and/or a virtual machine identifier.

6. The method of claim 1, wherein the current configuration information comprises a media access control (MAC) address and/or virtual machine identifier.

7. The method of claim 1 further comprising:
encrypting the registration information associated with the virtualized instance;
wherein storing the registration information in the virtualized instance comprises storing the encrypted registration information.

8. A computing system comprising:
a storage system;
a processing system operatively coupled to the storage system; and
program instructions stored on the storage system that, when executed by the processing system, direct the processing system to:
identify a request for a first initiation of a virtualized instance from an image;
in response to the request and the first initiation, initiating a process in the virtualized instance to determine registration information associated with the virtualized instance;
prevent ingress and/or egress communications for one or more communication formats prior to initiating the process to determine the registration information;
store the registration information in the virtualized instance;
in response to storing the registration information, delete the process that determined the registration information;
in response to deleting the process that determined the registration information, enable the ingress and/or egress communications for the one or more communication formats;
in response to a subsequent initiation of the virtualized instance after the first initiation, compare current configuration information associated with the subsequent initiation with the registration information stored in the virtualized instance to determine whether the subsequent initiation is permitted; and
in response to determining that the subsequent initiation is permitted, make an application associated with the image available to a user of the virtualized instance.

9. The computing system of claim 8, wherein the program instructions further direct the processing system to, in response to determining that the subsequent initiation is not permitted, block an execution of the application associated with the image.

10. The computing system of claim 8, wherein comparing the current configuration information associated with the subsequent initiation with the registration information stored in the virtualized instance to determine whether the subsequent initiation is permitted comprises:
determining whether a match exists between the current configuration information and the registration information;
determining that the subsequent initiation is permitted when the match exists.

11. The computing system of claim 8, wherein the virtualized instance comprises a virtual machine.

12. The computing system of claim 8, wherein the registration information comprises a media access control (MAC) address and/or a virtual machine identifier.

13. The computing system of claim 8, wherein the current configuration information comprises a media access control (MAC) address and/or virtual machine identifier.

14. The computing system of claim 8, wherein the program instructions further direct the processing system to:
encrypt the registration information associated with the virtualized instance;
wherein storing the registration information in the virtualized instance comprises storing the encrypted registration information.

15. One or more non-transitory computer readable storage media having program instructions stored thereon that, when executed by a processing system, direct the processing system to:
identify a request for a first initiation of a virtualized instance from an image;
in response to the request and the first initiation, initiating a process in the virtualized instance to determine registration information associated with the virtualized instance;
prevent ingress and/or egress communications for one or more communication formats prior to initiating the process to determine the registration information;
store the registration information in the virtualized instance;
in response to storing the registration information, delete the process that determined the registration information;
in response to deleting the process that determined the registration information, enable the ingress and/or egress communications for the one or more communication formats;
in response to a subsequent initiation of the virtualized instance after the first initiation, compare current configuration information associated with the subsequent initiation with the registration information stored in the virtualized instance to determine whether the subsequent initiation is permitted; and
in response to determining that the subsequent initiation is permitted, make an application associated with the image available to a user of the virtualized instance.

* * * * *